M. U. BERNHEIM (NOW BY JUDICIAL CHANGE OF NAME M. U. BURNHAM).
SELF ALINING BEARING.
APPLICATION FILED FEB. 15, 1918.

1,373,046. Patented Mar. 29, 1921.

Inventor
M. U. Bernheim,

Witness
F. G. Campbell.

By C. J. Stockman.
Attorney

UNITED STATES PATENT OFFICE.

MORRIS U. BERNHEIM, (NOW BY JUDICIAL CHANGE OF NAME MORRIS U. BURNHAM,) OF CINCINNATI, OHIO, ASSIGNOR TO THE ALVEY-FERGUSON COMPANY, OF OAKLEY, CINCINNATI, OHIO, A CORPORATION OF OHIO.

SELF-ALINING BEARING.

1,373,046.      Specification of Letters Patent.     Patented Mar. 29, 1921.

Application filed February 15, 1918. Serial No. 217,421.

*To all whom it may concern:*

Be it known that I, MORRIS U. BERNHEIM, a citizen of the United States, residing at Cincinnati, in the county of Hamilton and State of Ohio, have invented certain new and useful Improvements in Self-Alining Bearings, of which the following is a specification.

The present invention relates to bearings for conveyer rollers and its object is to provide an improved type of bearing constructed in such manner that it may be quickly placed in position or removed, will be self alining in use and will provide efficient means for maintaining lubrication of the journal mounted therein, with a minimum of attendance upon the part of the operator.

To secure the foregoing results in a simple, economical and efficient way I provide the frame of the conveyer with openings in which the bearings constituting the present invention are adapted to be slipped. These bearings are provided with means for preventing endwise movement thereof with respect to the conveyer frame but such means are of such a nature as to permit a rocking movement of the bearings with relation to the conveyer frame. The movement permitted the bearings with respect to the conveyer frame renders the bearings self alining, while the fact that these bearings are merely slipped into position instead of being secured by bolts or like fastening devices renders it very easy to place the bearings in position or to remove them when desired.

Each bearing comprises a preferably cylindrical body having a bore for the reception of the shaft of a conveyer roller, which bore communicates with a cup in which a piece of cotton waste may be placed. By supplying this cup with oil the shaft of the roller will be lubricated throughout a long period of time without attention upon the part of the operator.

While I have illustrated the invention as being applied to the rollers of belt conveyers it is to be understood that the invention is not limited thereto but that the bearing herein shown and described may be used in conjunction with other types of conveyer rollers as for example, the freely rotatable rollers of gravity conveyers.

Further objects and advantages of the invention will be set forth in the detailed description which now follows.

In the accompanying drawing.

Like numerals designate corresponding parts in all of the figures of the drawing.

Figure 1:
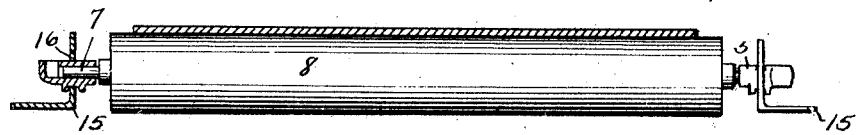
Figure 1 is a transverse sectional view through a belt conveyer having the invention applied thereto.
Figure 2:
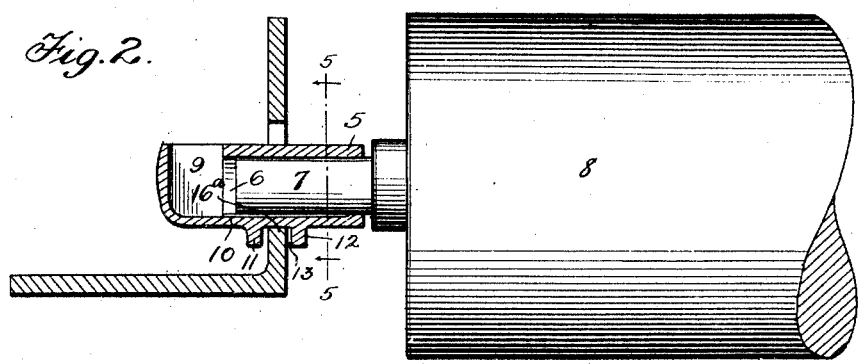
Fig. 2 is a partial longitudinal sectional view, upon an enlarged scale, of one of the bearings and the associated roller.
Figure 3:
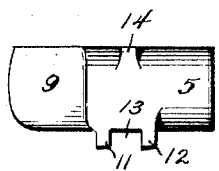
Fig. 3 is a side elevation of the bearing.
Figure 4:
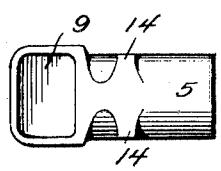
Fig. 4 is a plan view of the bearing.
Figure 5:
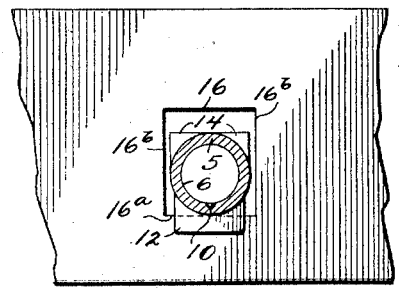
Fig. 5 is a sectional view upon line 5—5 of Fig. 2.

Referring to the drawing it will be seen that my improved bearing comprises a preferably cylindrical body portion 5, the bore 6 of which constitutes the bearing for the reduced end 7 of the shaft of a conveyer roller 8. The bore 6 has communication with the interior of a cup like extension 9 which serves as a receptacle for a piece of waste and oil. An oil groove 10 is formed in the bottom of the bore 6 and extends from the cup 9 to a point adjacent the opposite end of the bore 6. Transversely extending spaced lugs 11 and 12 depend from the bottom of the bearing and provide a recess 13 between them. Shoulders 14 are formed upon the bearing above and in line with the recess 13.

The conveyer frame comprises angles 15, the vertical portions of which are provided with openings 16, through which the bearings project when the bearings are placed in position. The lower wall of the opening 16 indicated at 16ª engages in the recess 13. The lugs 11 and 12 then prevent endwise movement of the bearing but permit a limited rocking movement of the bearing upon the wall 16ª. The shoulders 14 lie in transverse alinement with the side walls 16ᵇ of the openings 16 and the openings are slightly wider than the width of the bearing so that the bearings may have a limited side motion in the openings. The movements permitted the bearings render these bearings self alining, causing them to seek the position in which the least resistance will be brought upon the conveyer rollers. When used in conjunction with belt conveyers, a belt indicated at 17 passes over these rollers but it is to be understood that the roller illustrated may be a freely rotatable roller of a gravity conveyer.

The form of the invention illustrated in the accompanying drawing is merely exemplary. The invention is not limited to the particular form of bearing shown but includes within its purview whatever changes fairly come within the spirit of the appended claims.

Having described my invention what I claim is:

1. In a bearing for conveyer rollers, the combination with a conveyer frame having an opening, of a bearing mounted in said opening and having an element to engage the conveyer frame and resist endwise movement of the bearing but permit rocking movement of the bearing with respect to the frame, said bearing and element being of such diameter with relation to the opening as to permit the bearing and said element to be freely inserted and removed.

2. In a bearing for conveyer rollers, the combination with a conveyer frame comprising a thin plate like member having an opening formed therethrough and a bearing adapted to be passed therethrough said bearing having means upon its bottom for engaging the wall of the opening at the bottom of said opening to hold the bearing against endwise displacement while permitting rocking movement thereof upon said wall.

3. A structure of the character described comprising a body portion and a pair of spaced elements carried thereby adapted to receive a part of a conveyer frame between them and to resist endwise movement of the bearings with relation to the conveyer frame while permitting a limited rocking of said bearing.

4. A bearing comprising a body portion having a bearing bore, a cup in communication with said bore and a pair of spaced lugs depending from the bottom of the body portion, said lugs being adapted to be arranged upon opposite sides of a supporting member.

5. A bearing comprising a body portion having a bearing bore, a cup in communication with said bore and a pair of spaced lugs depending from the bottom of the body portion and a pair of shoulders upon the body portion above and between said lugs.

6. The combination with a conveyer frame having an opening formed therethrough, of a bearing comprising a body portion having a bearing bore and a pair of spaced lugs, said lugs being far enough apart to receive the bottom wall of said opening between them and the opening being sufficiently greater in width than the bearing to permit a limited sidewise movement of the bearing in said opening.

7. The combination with a conveyer frame having an opening formed therethrough, of a bearing comprising a body portion having a bearing bore, a pair of spaced lugs, said lugs being far enough apart to receive the bottom wall of said opening between them and the opening being sufficiently greater in width than the bearing to permit a limited sidewise movement of the bearing in said opening, and shoulders carried by the bearing which lie in alinement with the side walls of said openings.

8. The combination with a conveyer frame member having an opening formed therethrough, of a bearing comprising a body portion having a bearing bore formed therein and having a cup extension which communicates with said bearing bore, spaced lugs depending from the bottom of said body portion and receiving the bottom wall of the opening between them, and shoulders upon said body portion which lie in alinement with the side walls of said opening, said opening being sufficiently greater in width than the width of the bearing to permit a limited sidewise movement of the bearing in said opening.

In testimony whereof I affix my signature in the presence of two witnesses.

MORRIS U. BERNHEIM.

Witnesses:
 E. A. GARTTMAN,
 H. T. SALT.